F. PFEIFFER, Sr.
INSECT DESTROYER.
APPLICATION FILED OCT. 15, 1918.
1,286,763.
Patented Dec. 3, 1918.
2 SHEETS—SHEET 1.
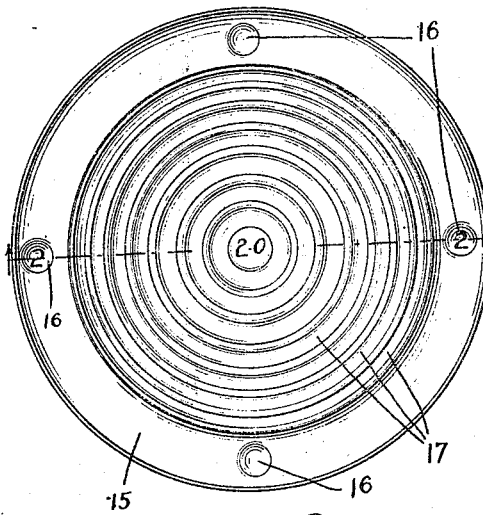
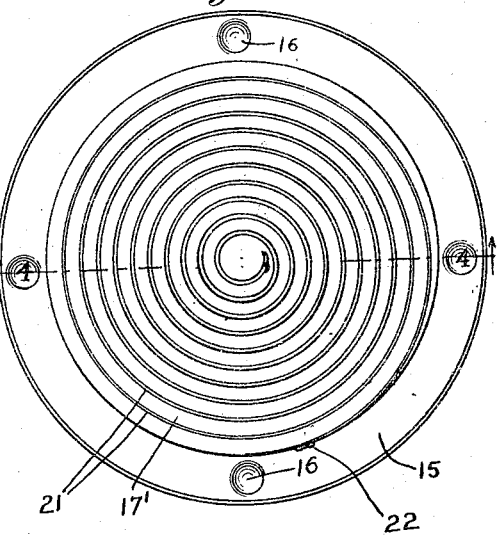
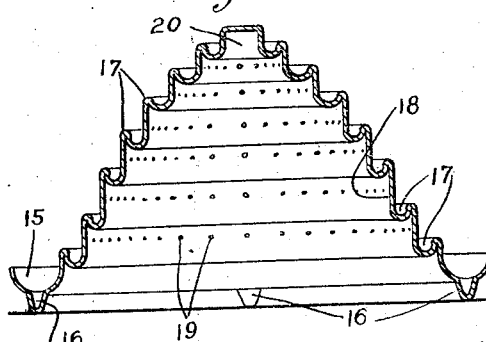
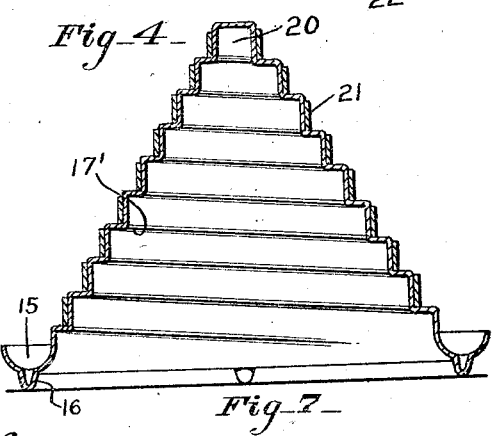
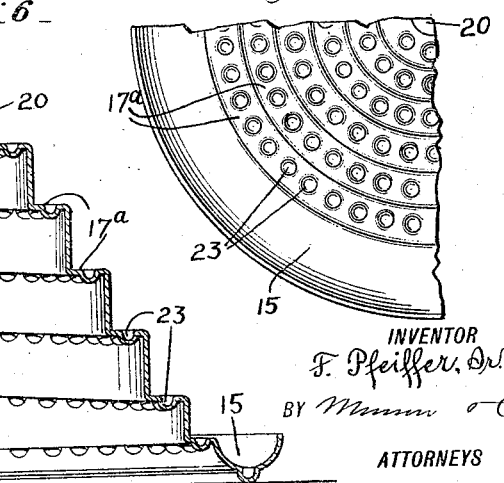
WITNESSES
Frank C. Palmer.
G. C. Beeler
INVENTOR
F. Pfeiffer, Sr.
BY
ATTORNEYS

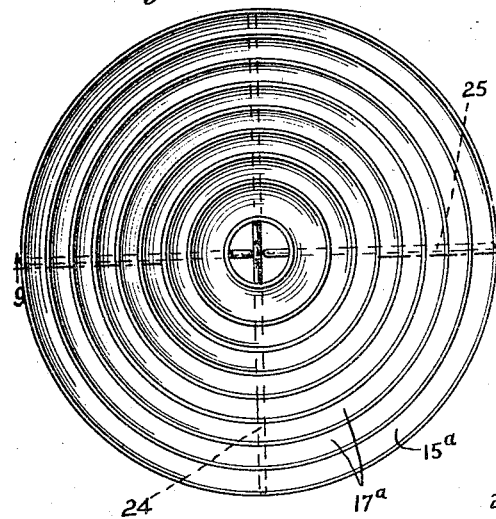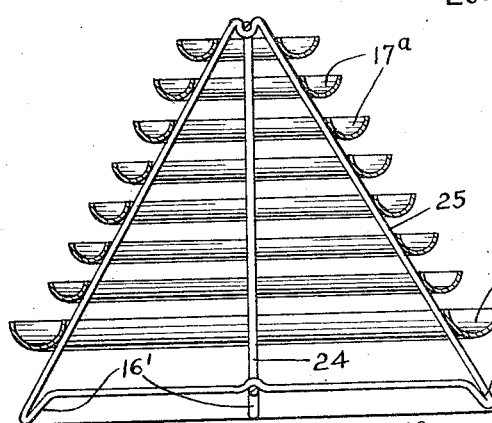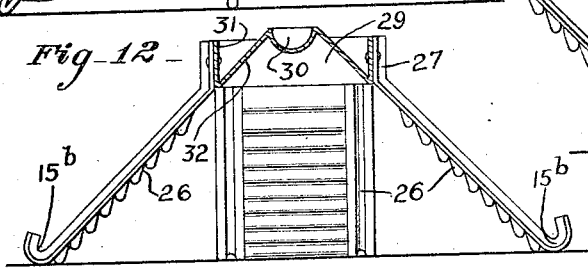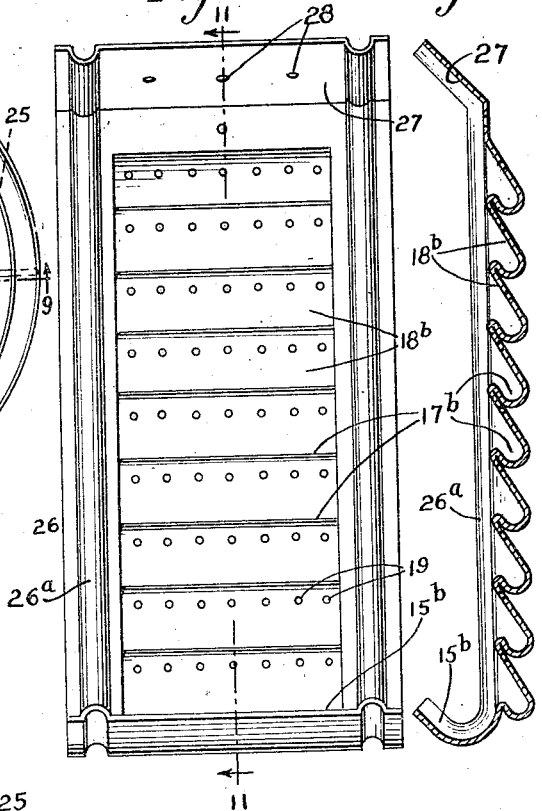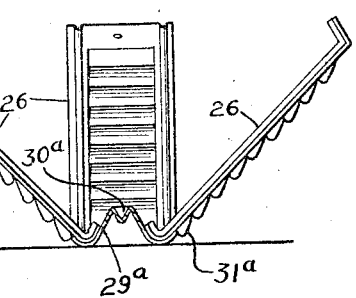

UNITED STATES PATENT OFFICE.

FREDERICK PFEIFFER, SR., OF NEWARK, NEW JERSEY.

INSECT-DESTROYER.

1,286,763.   Specification of Letters Patent.   Patented Dec. 3, 1918.

Application filed October 15, 1918. Serial No. 258,151.

*To all whom it may concern:*

Be it known that I, FREDERICK PFEIFFER, Sr., a citizen of the United States, and a resident of Newark, in the county of Essex and State of New Jersey, have invented a new and Improved Insect-Destroyer, of which the following is a full, clear, and exact description.

This invention relates to means or appliances for destroying insects such as flies, ants, or the like, and has particular reference to appliances or containers adapted to hold either a poison or a viscous composition for holding the insects until they are destroyed by burning or the like.

A further object of the invention is to provide a container or holder in a peculiar or novel form but made of cheap quality of paper or the like for the purpose of destroying the same and substituting a fresh supply when becoming charged with insects.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which Figure 1 is a plan view of the structure of Fig. 2.

Fig. 2 is a vertical section on the line 2—2 of Fig. 1.

Fig. 3 is a plan view of the structure of Fig. 4.

Fig. 4 is a vertical section on the line 4—4 of Fig. 3.

Fig. 5 is a fragmentary view of a strip of material to be applied to any of the beehive structures.

Fig. 6 is a vertical sectional view of a further modification.

Fig. 7 is a partial plan view of the same.

Fig. 8 is a plan view of the structure of Fig. 9.

Fig. 9 is a vertical section on the line 9—9 of Fig. 8.

Fig. 10 is a front elevation of a further modification.

Fig. 11 is a vertical section of the same on the line 11—11; and

Figs. 12 and 13 are vertical views indicating various assemblages employing the units such as are shown in Figs. 10 and 11.

In all forms of my improvement I provide holders or containers for either a poison or a viscous substance, said containers being made preferably of cheap strawboard or the like which may be procured at very low cost, and whereby the containers may be discarded or destroyed frequently for sanitary purposes. Furthermore in all forms of the invention the holders or containers are so designed that a great many units thereof may be closely nested or assembled for storage or transportation purposes, which fact furthermore adds to the cheapness of the supply.

In Figs. 1 and 2 I show a device which may be described as in the form of a beehive or approximately conical, the same comprising a trough shaped base 15 of annular form and provided with a plurality of downwardly pressed feet 16. Extending upward and inward from the trough 15 are other annular troughs or ledges 17, each upper ledge being smaller in diameter than the next lower ledge and having a substantially vertical or cylindrical inner wall 18 preferably provided with a multiplicity of holes 19. This form of structure terminates in an apex 20 which is preferably imperforate. A device made in accordance with this disclosure is adapted to receive upon its outer or upper surface any suitable insecticide or viscous material. Such commodity in any desired form may be dumped or poured upon the apex 20 whence it will flow or fall down into or over all of the various ledges 17, portions thereof being retained in the troughs formed by such ledges. The gutter 15 being of relatively large capacity is adapted to receive and retain any overflow of such material over the ledges 17. The structure just referred to obviously may be placed or stood at any desired place, or it may be suspended like a bird cage by attaching a string or wire either to the apex or any other portion thereof through the holes 19. When the device becomes charged with insects or otherwise unsanitary it may readily be consigned to the flames and a fresh one substituted therefor.

In Figs. 3 and 4 in place of the annular independent ledges 17 the conical structure is formed with a spiral ledge 17' either with or without perforations therethrough, but similar to the structure of Fig. 2 it is provided with a gutter 15 at the bottom having feet 16 and terminating in an apex 20 at the top. The spiral ledge 17' is peculiarly adapted to receive and hold a strip of adhesive 21 or a strip of material such as paper adapted to be charged with poison or a viscous material either before or after applying it to the conical holder. As indicated in Fig. 5 the strip may be provided with end hooks 22 whereby it may be fastened after being applied to the holder. Obviously these hooks may be provided with sharp points adapted to project through any of the holes 19 provided in the holder or the points may be sharp enough to stick like pins into the strawboard structure of which the holder is preferably composed. The gutter 15 serves purposes in this form of the invention similar to those in Fig. 2.

In Figs. 6 and 7 the conical holder includes a gutter 15, a succession of spiral ledges 17$^a$, and an apex 20. The ledges, however, are provided with pits 23 preferably without perforations although the vertical walls 18 thereof might be perforated if desired. These pits 23 are peculiarly adapted to hold a liquid poison or a viscous liquid that may be poured over the conical holder from the apex, the liquid being adapted to flow from the apex along the spiral toward the gutter, small portions of the substance being retained in the successive pits.

In Figs. 8 and 9 I show a metallic skeleton comprising two interlocking parts 24 and 25 each having a pair of feet 16' and forming when interlocked at right angles in vertical planes a substantially conical base or skeleton for a series of gutters 15$^a$ and 17$^a$ all made as separate units and adapted to be supported in succession upon the skeleton support. The ledge or gutter 15$^a$ is the largest both in cross section and in diameter and serves the same purpose as the gutter 15 above described, while the ledges 17$^a$ may be smaller in capacity as well as being either of smaller radius toward the top or apex of the frame. These gutters are preferably made of paper, or its equivalent, and hence may easily be destroyed when becoming foul. The skeleton itself being made of metal, or its equivalent, may be sterilized by fire or hot water whenever desired without damage. These gutters 17$^a$ are adapted to receive any suitable insecticide or viscous material poured thereover from the top, and the gutter 15$^a$ will receive any overflow or surplus thereof.

In the remaining figures I show a different design or form of insecticide holder or container, the same being approximately flat or panel shaped as indicated as a whole at 26 stamped from cheap strawboard, paper, or other sheet material. The main portion of the panel 26 is provided with horizontal ledges or gutters 17$^b$, the upstanding walls thereof 18$^b$ being shown as provided with a multiplicity of perforations 19 which may be large and numerous enough to transmit a considerable amount of light. At the top of the panel 26 is provided an angularly deflected flange 27 having one or more large holes 28 through which fasteners, hooks, or the like may be passed, and hence this device is adapted to be supported or hung from a nail driven in the wall or window frame, or it may be suspended from a wire or cord, while the insecticide may be poured or placed into the gutters 17$^b$. At the bottom is provided a large gutter 15$^b$ to catch the surplus of such material.

In Fig. 12 I show an assemblage of the panel units 26, a plurality of the same being shown connected through the flanges 27 to a crown piece 29 which may be made of tin, cheap paper, or other suitable sheet material stamped or pressed into the form indicated, and including a cup 30 at the top. The crown piece includes a vertical outer flange 31 between which and the cup 30 is a conical wall 32. As indicated the crown piece is square in plan view and so adapted to have connected thereto four of the units 26. The bottoms of the gutters 15$^b$ so constitute the feet upon which the assemblage may be supported.

In Fig. 13 the several units 26 are shown supported upon a base piece 29$^a$ having characteristics similar to the crown piece 29 including a cup 30$^a$ at the top. Instead, however, of the flanged ends 27 being secured to the outer flange 31$^a$ the gutter portions 15$^b$ are fitted therein, and hence the units have an upwardly and outwardly flaring position instead of a downwardly and outwardly flaring position as in Fig. 12. The units 26 are shown as provided with lateral parallel grooves or ribs 26$^a$ to stiffen the same. These as is true with the other forms of the invention are well adapted for close nesting purposes and all made or produced at a very low cost.

I claim:

1. In an insect destroyer, a holder formed of thin cheap sheet material and having formed therein a succession of liquid containing members, and having a gutter along its lower end to receive any overflow of liquid from said holding members.

2. In an insect destroyer, a holder stamped or pressed from thin cheap sheet material and having therein a succession of liquid containing depressions, the general form of the structure being conical, and a gutter arranged adjacent to the bottom of the structure to receive any overflow of liquid from the containers above it.

3. In an insect destroyer, a liquid or poison holder comprising a succession of stepped ledges arranged in a general inclination with respect to the vertical, and means to support the same in operative position.

4. The herein described insect destroyer comprising a rigid conical structure, the inclined surface of which is stamped, and having means extending around the same to hold and support a poisonous or viscous liquid.

FREDERICK PFEIFFER, Senior.

Copies of this patent may be obtained for five cents each, by addressing the "Commissioner of Patents, Washington, D. C."